July 25, 1944.    W. H. RADBRUCH    2,354,477
MEASURING DISPENSER
Filed Jan. 30, 1943
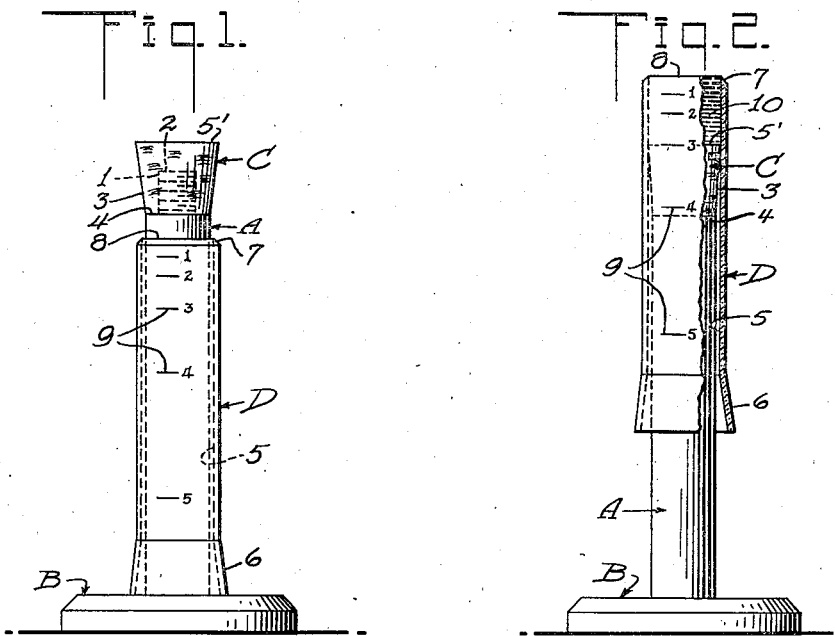
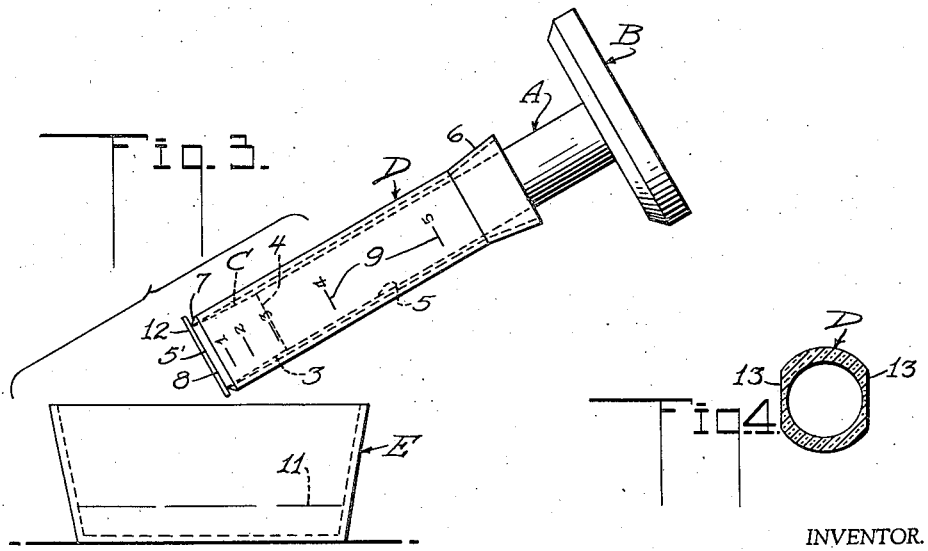
INVENTOR.
WALTER H. RADBRUCH
BY Munn, Liddy & Glaccum
ATTORNEYS Patented July 25, 1944

2,354,477

UNITED STATES PATENT OFFICE 2,354,477

MEASURING DISPENSER

Walter H. Radbruch, San Francisco, Calif.

Application January 30, 1943, Serial No. 474,187

3 Claims. (Cl. 73—165)

The present invention relates to improvements in a measuring dispenser, and it consists of the combinations, constructions and arrangements hereinafter described and claimed.

In a copending application I disclose a process of matching the coloring in protective and decorative coating materials. The application was filed on May 30, 1942, and the Serial No. is 445,-412. This process makes use of premeasured quantities of coloring pigments in different amounts, the pigments being mixed with clear or prepared bases according to formulas to form colors of the desired shades. Since each color is designated by a formula, it is possible to match the shade of any color at any time by merely following the formula. In two other copending applications I disclose containers for holding premeasured quantities of colored pigments. In one of these applications, Serial No. 398,928, filed June 20, 1941, now Patent No. 2,343,026 dated February 29, 1944, on a Combined container and dispenser, I disclose a rigid container with an ejector placed within the container. In the other application on a Combined container and ejector, Serial No. 436,066, filed March 25, 1942, I disclose a collapsible tube with an ejector plug mounted therein. Still another form of container is shown in my copending case on a Collapsible tube, Serial No. 452,518, filed July 27, 1942. This container carries a premeasured quantity of coloring pigment, and a stirring stick has a slot therein for receiving the tube and collapsing the tube wall for ejecting the contents when the tube is cut at one end and moved through the slot.

The three different types of containers shown in my three copending applications are designed to carry premeasured amounts of coloring pigments therein. These containers are known as the ejection type tubes. In commercial painting it is customary to use coloring pigments in bulk, and the present invention is designed to measure easily the colored pigments and to be able instantly to deliver the entire amount so measured so that the base will be colored and have the exact shade desired. The device will measure many kinds of material in bulk whether they be in liquid, paste, or powdered form. The graduations on the tube are marked to correspond with similar markings set forth in my copending application, Serial No. 445,412. In other words the numbers given to various sized tubes in that case refer to quantities of pigments which will be the same as the quantities measured from the bulk with my present device when similar numbers are used. My device can therefore form a part of or take the place of the tubes in my copending cases where premeasured quantities of material are delivered. The use of pigments in bulk has an advantage of costing slightly less than where tubes containing premeasured quantities of the material are used. The device is self-cleaning, and novel means is provided for taking up wear between the moving parts so that the device will accurately measure the material at all times. The device is extremely simple in construction.

Other objects and advantages will appear in the following specification, and the novel features of the device will be particularly pointed out in the appended claims.

My invention is illustrated in the accompanying drawing forming a part of this application, in which:

Figure 1 is a front elevation of the device shown in inoperative position;

Figure 2 is a view similar to Figure 1 and shows the device holding a premeasured quantity of material;

Figure 3 shows the device expelling the premeasured quantity of material; and

Figure 4 shows a cross section through the transparent tube.

While I have shown only the preferred form of my invention, it should be understood that various changes or modifications may be made within the scope of the appended claims without departing from the spirit of the invention.

In carrying out my invention I provide a plunger A that is mounted on a base B. The plunger and base may be made of any material desired, such as wood, plastic or the like. A cork C is mounted on the free end of the plunger A and is secured thereto by any means desired. In Figure 1 I illustrate the means for securing the cork C to the plunger A and this means comprises a threaded reduced shank 1 receivable in a threaded bore 2 provided in the cork C. Cement, not shown, may be applied to the threaded end 1 so as to cause the cork to be cemented to the plunger after the cork is screwed into place.

It will be noted from Figure 1 that the cork is slightly conical in shape having a conical outer surface 3 with the smaller end of the cork resting on the free end 4 of the plunger. The larger end 5' of the cork is larger than the inner diameter 5 of a transparent tube D. Although the cork end 5' is larger than the inner diameter 5 of the tube, the inner tube wall fits loosely about the plunger. The lower end of the tube is flared outwardly as at 6 for receiving the enlarged end 5' of the cork. The flared end 6 compresses the cork and 5' as the cork is moved into the tube. The top of the tube is chamfered as at 7 so that an edge 8 is formed at the tube top. The tube has markings 9 thereon which indicate different quantities of material to be measured.

From the foregoing description of the various parts of the device, the operation thereof may be readily understood.

I have already stated that the diameter of the end 5' of the cork is larger than the inner diameter of the tube and therefore the cork will be compressed by the wall 5 as it is moved into the tube interior. This gives the cork a wiping action on the interior wall 5 of the tube as the plunger is moved in the tube. Since the top edge of the cork is larger than the inner diameter of the tube, the top edge will be under the greatest amount of friction due to the compressing of the top edge with the result that this edge will act like a squeegee and wipe the interior of the tube clean so that the device may measure a different colored pigment without the need of first being cleaned. The cork may be wiped with a cloth dampened with a solvent.

When the device is not in use, the tube rests on the base B in the manner shown in Figure 1. The tube when in this position loosely receives the plunger. Any small foreign particle that might find its way between the plunger and tube will be free to drop out because of this loose fit. The tube and plunger therefore cannot jamb should any material work its way between the parts. When the device is used, the tube is moved forwardly on the plunger A, preferably with a helical movement, so that the top 5' of the cork will be brought into registration with the desired numbered graduation on the tube. In Figure 2 I show a cork top registering with the line 9 marked "3". The projecting portion of the tube now cooperates with the cork top 5' to form a receptacle that will hold a definite quantity of material, this material being indicated at 10. As already stated, the material may be in liquid, paste, or powdered form. Any excess material can be removed by scraping the top edge 8 of the tube with a knife or other tool. The cork top 5' when compressed not only acts as a wiper for the inner tube wall as the plunger is moved, but also acts as a positioning member for preventing the tube from accidentally dropping to the base B when the tube is once moved into proper position.

In Figure 3 I show a container E that may hold a predetermined amount of a base material indicated at 11. The device is placed over the container E in an inclined position and the plunger moved forwardly for ejecting the tinting material from the tube and into the container where it can be mixed with the base material 11. In order to remove all of the premeasured material from the tube, a knife 12 or stirring stick is moved across the top 5' of the cork for removing any material adhering thereto. In this way the exact amount of premeasured material is delivered to the container because all of the material is ejected from the tube. The cork can be wiped with a cloth dampened with a solvent so that all remaining traces of color may be removed and the measuring device is ready for further use.

The edge will be worn away in time due to the cleaning and this will cause the edge of the cork to become slightly rounded in shape. The result is that the device will not measure accurately because the cork top is not flat. To overcome this the worn top of the cork may be removed by bringing the cork top into alignment with the tube edge 8 and then moving a sharp knife across the edge 8 for cutting a thin slice of the cork top. This will make the surface 5' flat and the tube can again accurately measure the desired quantity of material. The cork has a large enough diameter at its top to permit a considerable number of shavings to be made before the compression becomes too little to hold the tube and a new cork must be substituted.

In Figure 4 I show the tube C provided with flattened sides 13. The purpose of these sides is to permit the tube to be gripped more tightly when moving the plunger therethrough. The cork fits tightly enough in the tube to make it desirable to rotate the plunger slightly as it is moved longitudinally through the tube. I designate this kind of movement as a helical movement. The rotation of the plunger in the tube is made possible by holding the flattened sides 13 of the tube against rotation. The term cork is used in a broad sense to include any type of flexible ejector made of any suitable material.

It is possible to place a sheet of paper over the cork before inserting the plunger into the tube. The paper can be removed after the cork is moved through the tube top and this will keep the cork free from coloring pigment.

I claim:

1. A measuring dispenser comprising a cylindrical plunger mounted on a base, a cork top mounted on the plunger and being slightly conical in shape with its smaller end equal in diameter to the plunger end and being secured to the end of the plunger, a transparent tube telescoped over the plunger, the inner surface of the tube being slightly larger in diameter than the outer surface of the plunger but slightly smaller in diameter than the larger end of the conical cork, whereby the free end of the cork will be compressed slightly and will deliver a wiping action to the tube interior as it is moved therethrough, the lower end of the tube being flared outwardly to receive the cork when the plunger is inserted into the tube, said tube having graduations marked thereon to denote different amounts of material that the tube will hold when the desired marking is brought into alignment with the outer end of the cork.

2. A measuring dispenser comprising a cylindrical plunger mounted on a base, a cork top mounted on the plunger and being slightly conical in shape with its smaller end equal in diameter to the plunger end and being secured to the end of the plunger, a transparent tube telescoped over the plunger, the inner surface of the tube being slightly larger in diameter than the outer surface of the plunger but slightly smaller in diameter than the larger end of the conical cork, whereby the free end of the cork will be compressed slightly and will deliver a wiping action to the tube interior as it is moved therethrough, said tube having graduations marked thereon to denote different amounts of material that the tube will hold when the desired marking is brought into alignment with the outer end of the cork.

3. A measuring dispenser comprising a plunger, a compressible top mounted on the plunger and being slightly conical in shape with its smaller end equal in diameter to the plunger end, the free end of the compressible top being flat and extending at right angles to the plunger axis, and a transparent tube telescoped over the plunger, the inner surface of the tube being slightly larger in diameter than the outer surface of the plunger but slightly smaller in diameter than the larger end of the conical compressible top, whereby the free end of the compressible top will be compressed slightly and will deliver a wiping action to the tube interior as it is moved therethrough, said tube having graduations thereon for indicating where to aline the outer end of the compressible top for measuring different amounts of material.

WALTER H. RADBRUCH.